UNITED STATES PATENT OFFICE.

LEVI HAAS, OF CHESTER, PENNSYLVANIA.

FERTILIZER.

SPECIFICATION forming part of Letters Patent No. 318,371, dated May 19, 1885.

Application filed May 19, 1884. (No specimens.)

*To all whom it may concern:*

Be it known that I, LEVI HAAS, a citizen of the United States of America, residing at Chester, in the county of Delaware and State of Pennsylvania, have invented certain new and useful Improvements in Fertilizers, of which the following is a specification.

My invention relates to an improved process of producing at minimum cost a fertilizer of superior quality, substantially as hereinafter more fully shown, and pointed out in the claim. In the accomplishment of this object I take thirty pounds of ground furnace-slag, thirty pounds of ground oyster-shells, ten pounds of charcoal, five pounds of tan-bark waste, or an equal amount of the flour of saw-meal, five pounds of ground tobacco-stems, five pounds of broom-corn-seed meal, or its equivalent as to weight in cotton-seed meal or linseed-cake, one pound of nitrate of soda, ten pounds of sulphate of soda, and ten pounds of salt, and grind these materials together into a homogeneous compound, hereinafter specified, and thoroughly blend therewith a liquid composed of one hundred parts of water and ten parts of sulphuric or muriatic acid, or in lieu of the acid an equal quantity of ammonia. The compound thus produced I then put aside, and subsequently thoroughly intermingle it with a second compound, which I formulate and produce as follows: I take twenty pounds of land-plaster, twenty pounds of ashes or phosphatic iron ores, twenty pounds of ground phosphatic rock, twenty pounds of ground slag, and twenty pounds of kainit, which I grind up into a second compound. I then take this compound and the compound first aforementioned and thoroughly blend and intermingle them in equal quantities, and thus produce a very superior fertilizer at minimum cost, whose enriching effects upon the soil are unsurpassed and almost permanent.

Having thus fully described my invention, what I claim, and desire to secure by Letters Patent, is—

A fertilizer composed of furnace-slag, oyster-shells, charcoal, tan-bark waste, or its equivalent, tobacco-stems, broom-corn-seed meal or its equivalent, nitrate of soda, sulphate of soda, salt, diluted sulphuric acid or ammonia, plaster, ashes, phosphatic iron ores, phosphatic rock, ground slag, and kainit, intermingled and blended in the manner substantially as described.

In testimony whereof I affix my signature in presence of two witnesses.

LEVI HAAS.

Witnesses:
   HENRY HINKSON,
   P. M. WASHABAUGH.